United States Patent [19]

Malandain et al.

[11] Patent Number: 5,137,747

[45] Date of Patent: Aug. 11, 1992

[54] DESICCANT POWDER, ITS USE FOR THE DRYING OF SOLID SUBSTRATES, IN PARTICULAR GRAINS OR SEEDS

[75] Inventors: Michel Malandain, Saint-Germain en Lay; Gérard Trouve, Costres; Christine Le Borgne, Lautrec, all of France

[73] Assignee: Societe d'Exploitation de Produits pour les Industries Chimiques - S.E.P.P.I.C., Paris, France

[21] Appl. No.: 618,728

[22] Filed: Nov. 27, 1990

[30] Foreign Application Priority Data

Dec. 6, 1989 [FR] France .................. 89 16135

[51] Int. Cl.$^5$ .................. A01G 5/06; A01N 1/00
[52] U.S. Cl. .................. 427/4; 252/194; 47/57.6; 427/204; 427/214; 427/397.7
[58] Field of Search .................. 252/194; 47/57.6; 427/397.7, 4, 204, 214

[56] References Cited

U.S. PATENT DOCUMENTS

| | | | |
|---|---|---|---|
| 3,168,796 | 2/1965 | Scott et al. | 47/1 |
| 3,567,645 | 3/1971 | Dultz | 252/194 |
| 4,368,591 | 1/1983 | Barke | 47/57.6 |
| 4,535,098 | 8/1985 | Evani et al. | 521/149 |
| 4,556,505 | 12/1985 | Fenn | 252/194 |
| 4,561,995 | 12/1985 | Fenn | 252/194 |
| 4,615,823 | 10/1986 | Tokuyama et al. | 252/194 |
| 4,797,227 | 1/1989 | Tom et al. | 252/194 |
| 4,985,061 | 1/1991 | Hughes | 71/68 |

FOREIGN PATENT DOCUMENTS

| | | |
|---|---|---|
| 13769 | 9/1982 | European Pat. Off. . |
| 2111972 | 6/1972 | France . |
| 2025200 | 6/1979 | United Kingdom . |

*Primary Examiner*—Richard D. Lovering
*Assistant Examiner*—N. Bhat
*Attorney, Agent, or Firm*—Ladas & Parry

[57] ABSTRACT

The present invention relates to a novel desiccant powder and its use for the drying of solid substrates wetted by an aqueous or oily liquid such as, in particular, grains or seeds having undergone a coating or surface film-forming treatment.

According to the invention, this desiccant powder contains at least 50% by weight of absorbents with respect to the toal weight of the said powder, being preferably available in the form of particles having a mean diameter less than about 100μ, the said absorbents being constituted of at least one aluminosilicate, in particular mica, to at least 25% by weight with respect to the total weight of the said absorbents.

This powder makes possible, in particular, the drying of colored grains or seeds.

17 Claims, No Drawings

DESICCANT POWDER, ITS USE FOR THE DRYING OF SOLID SUBSTRATES, IN PARTICULAR GRAINS OR SEEDS

Substantially, the object of the present invention is a novel desiccant powder intended, in particular, for the drying of solid substrates wetted by an aqueous or oily liquid such as, in particular, grains or seeds having undergone a coating or surface film-forming treatment.

It is known that the germination capacities of grains or seeds can be improved by a coating or surface film operation designed to affix dressing agents for specific additives in predetermined amounts to these grains or seeds, preferably in a uniform manner.

More precisely, this operation consists of applying to the grains or seeds, for example, by spraying, blending, churning or any other known means, a "paste" of surface film or coating containing essentially plant protection, fungicidal or insecticidal dressings, additives designed to accelerate germination (micro-organisms, trace elements) in an aqueous solution of film-forming agents. In addition, this paste may contain various additional agents, such as binders, pigments or coloring materials, plasticizers and wetting agents.

The film-forming agents which may be used for the surface film formation are usually film-forming polymers soluble or dispersible in water, not exhibiting phytotoxicity and not causing delay or decline in germination. Such polymers are, for example, acrylic polymers, polyvinyl alcohols, polylactones and cellulose derivatives. The document EP-O 133 827, incorporated here for reference, describes various examples of film-forming compositions for the coating of solid substrates.

The operation of film formation or coating makes possible a more rational and more efficient use of the dressing agents and additives dosed with precision for each seed.

In addition, the application of a surface film to grains or seeds offers the following three advantages:

it gives to the grain or seed a smooth and attractive appearance, in particular when the film is colored;

it permits easy identification, for example, as a result of surface coloration;

finally, it provides better flow in the drills and other mechanical transfer devices in which the grains slip easily over each other.

Moreover, in order to ensure a good distribution of the dressing agents and additives on the grains and seeds, the paste from which the surface film is formed and in particular the film-forming solution must be sufficiently fluid. For this purpose, the dry material content rarely exceeds 15 to 20% by weight. Consequently, relatively large amounts of water (up to about 50 g per kilo of seeds treated) are to be removed by a drying operation.

This drying operation which, from an industrial point of view, must be rapid, efficient and inexpensive, usually proves to be difficult. In fact, some grains, as for example soja, rapidly absorb water when they are in contact with the surface film paste. The resulting excess internal humidity may lead to undesirable biochemical reactions, impair grain storage and modify its germination capacity. Furthermore, the absorption of water is usually accompanied by swelling of the grain, which only very slowly resumes its initial form. Now, the film surrounding the grain is not always sufficiently elastic to cope with these variations in volume and there is a risk of signs of disintegration and/or cracking appearing.

Moreover, the formation of agglomerates of film-coated grains is observed when drying is insufficient or too slow. Such agglomerates do not lead to uniform seeding and are thus to be avoided.

Finally, in the case of many types of seeds, particularly those of large-scale crops, the initial cost created by the operation of surface film formation, and in particular the drying operation, must be kept to a minimum. This constraint makes it practically impossible to use sophisticated and expensive machinery.

Among the known drying techniques, hot air blowing is one of the most commonly used.

In the case of grains with high added value representing small volumes (kitchen garden and flower seeds, some hybrid species), equipment of the fluidized air bed type is used. On the other hand, for less select seeds, simple tunnels or ventilated turbines, operating at high throughput, are used.

However, air blowing presents a certain number of disadvantages which limits its value.

In fact, the efficiency of this drying technique remains low on account of the low temperatures used in order not to damage the seeds.

In addition, this technique entails heavy expenditure owing to the depreciation costs of the equipment and the expensive energy consumption.

Finally, this technique causes certain pollution problems.

The problem of drying has been resolved by the use of desiccant powders. More precisely, powders are dusted onto the film-coated grains, by remaining fixed to the film former, by thus avoiding any correlative risk of dust formation during the subsequent handling of the grains or seeds.

The use of desiccant powders is a technique which does not require any expensive investment and which can be implemented easily on all existing types of film-forming or coating materials.

All of the desiccant powders used hitherto are based on magnesium silicate, in particular they are based on talc or serpentine.

However, the grains dried with talc possess a dull, lackluster, whitish appearance. This disadvantage is negligible when the grains are coated or covered with a surface film by means of a colorless film-forming agent, but becomes quite flagrant when the surface film is formed with colored or glossy film-forming agents, one of the objectives of which is to give to the grain or seed an attractive appearance.

The aim of the present invention is to resolve the technical problem consisting in the provision of a novel desiccant powder possessing the same advantages as the magnesium silicate-based desiccant powders without having their disadvantages previously mentioned.

It has been discovered, and that constitutes the basis of the present invention, that the use of aluminosilicate-based, and in particular mica-based, desiccant powders enables the appearance of the grains thus dried to be considerably improved. In fact such grains possess a vivid appearance and their coloration is unaltered.

In addition, it has been quite unexpectedly discovered that the amounts of such novel desiccant powders required for use are much lower than the amounts of known desiccant powders based on talc in order to obtain the same degree of drying.

Thus, according to a first feature, the present invention relates to a desiccant powder intended in particular for the drying of solid substrates wetted by an aqueous or oily liquid such as, in particular, grains or seeds having undergone a coating or surface film-forming treatment, characterized in that it contains at least 50% by weight, with respect to the total weight of the said powder, of absorbents preferably available in the form of particles having a mean diameter of less than about 100μ, the said absorbents being constituted of at least one aluminosilicate to at least 25% by weight with respect to the total weight of the said absorbents.

According to a particular characteristic of the invention, this aluminosilicate is selected from the group constituted by mica, the illites or micaceous clays, the micaceous pigments, kaolin and its modifications, such as kaolinite, dickite, nacrite, the montmorillonites or smectites, the glauconites, the attapulgites, the vermiculites.

According to a preferred embodiment, the aforementioned aluminosilicate is mica.

The absorbents contained in a desiccant powder conforming to the invention may be constituted exclusively of one or several aluminosilicates, but may also be constituted of one or several aluminosilicates in a mixture with one or several traditional absorbents such as talc, cellulose, silica. The person skilled in the art will easily be able to define compositions of absorbents according to the intensity of the glossy effect which it is desired to give to the substrates.

According to another particular characteristic of the invention, this desiccant powder contains, in addition, up to 50% by weight, with respect to the total weight of the said powder, of a pigment, a micaceous pigment, a coloring matter or a pigmentary paste.

According to another particular characteristic, a desiccant powder conforming to the invention contains, in addition, up to 50% by weight, with respect to the total weight of the powder of at least one film-forming agent. The presence of such a film-forming agent within the powder confers on this latter an improved adherence to the solid substrate to be dried. It is possible to use any known type of film-forming agent, and in the particular case of seeds or grains, film-forming agents of the same type as those used for the coating operation.

According to another particular characteristic, a desiccant powder conforming to the invention contains, in addition, up to 20% by weight, with respect to the total weight of the powder, of at least one flow-promoting agent such as, in particular, powdered silicas. The addition of one or several flow-promoting agents to the desiccant powder improves the uniformity of the dusting of the substrate. It is possible to use as flow-promoting agent all of those commonly used in the food·or pharmaceutical industries and, in particular, powdered silicas, in particular Aerosil ® (registered trademark) or Sipernat ® (registered trademark).

The novel desiccant powders conforming to the present invention possess the following general characteristics:

they are not toxic towards the substrates; in the case in which the substrate is a grain, no modification of germination is observed;

they are compatible with plant protection products and do not bring about any impairment of their activity;

they exhibit a high absorbent capacity (large specific surface), and stable physical structures.

According to a second feature, the present invention relates to the use of a desiccant powder such as previously defined for the drying of solid substrates wetted by an aqueous or oily liquid such as, for example, grains or seeds having undergone a coating or surface film-forming treatment.

Finally, according to a last feature, the present invention aims to cover a process for the drying of solid substrates wetted by an aqueous or oily liquid such as, in particular, grains or seeds having undergone a coating or surface film-forming treatment, characterized in that it comprises the dusting of a desiccant powder such as previously defined in an amount of 0.5 to 50 g per kilogram of solid substrates.

The following non-limiting examples illustrate the novel desiccant powders conforming to the invention and their utilization.

In these examples, the aluminosilicate is usually mica, which has proved to be particularly useful for the manufacture of these novel desiccant powders.

EXAMPLE 1

100 g of grains are placed in a HEGE 1 machine equipped with a 1000 ml bowl with a rotating bottom.

A paste of coating liquid consisting of a colored cellulosic film-forming agent of the Sepiret ® line (registered trademark) and a suitable plant protection product is introduced into the machine. A uniform film is formed around the grains after about 1 min. of mixing.

A desiccant powder constituted of 99.5% by weight of mica and 0.5% by weight of powdered silica is introduced, in its turn, into the machine and mixed for 30 s with the film-coated grains.

The conditions for the surface film-formation and the appearance of different seeds after drying by the mica-based powder are shown in table 1.

The amounts of plant protection product, film-forming agent and desiccant powder are given in grams for 100 g of untreated grains.

Similar assays have been carried out on an industrial scale on much larger quantities of grains and the same results have been obtained. The desiccant powder gives to the grains a glossy appearance and good flow properties.

TABLE 1

| Type of grain | Plant protection agent | | Film-forming agent | | Amount of desiccant used (g) | Appearance | |
|---|---|---|---|---|---|---|---|
| | Type | Amount used (g) | Nature | Amount used(g) | | Before drying | After drying |
| Colza | OFTANOL T | 2,000 | S. 7109 | 1,000 | 0,300 | moist & dull | dry, smooth, glossy |
| Colza | VITAVAX | 2,000 | S. 7020 | 0,700 | 0,200 | moist & dull | dry, smooth, glossy |
| Alfalfa | MESUROL + POMARSOL | 3,000 0,300 | S. 2008 | 1,500 | 0,500 | moist & slightly glossy | dry, glossy |
| Peas | PULSAN + QUINOLATE | 0,125 0,300 | S. 2021 | 0,160 | 0,500 | dull & heterogeneous | glossy, homogeneous |
| Soya | APRON 35 | 0,200 | S. 2001 | 0,300 | 0,500 | dull & hetero- | glossy, homo- |

TABLE 1-continued

| Type of grain | Plant protection agent | | Film-forming agent | | Amount of desiccant used (g) | Appearance | |
|---|---|---|---|---|---|---|---|
| | Type | Amount used (g) | Nature | Amount used(g) | | Before drying | After drying |
| Soya | VITAVAX 200 FF | 0,400 | S. 2004 | 0,400 | 0,500 | geneous, moist moist & dull poor homogeneity | geneous dry, smooth, glossy |
| Sunflower | APRON 35 + BENLATE | 0,600 0,200 | S. 4018 | 1,000 | 0,200 | moist | dry & glossy |
| Vetch seeds | CAPTANE 400 SD | 0,180 | S. 2020 | 0,250 | 0,500 | moist & dull | dry & glossy |
| Maize | CORMAISON FI | 0,400 | S. 5013 | 0,200 | 0,200 | heterogeneous slightly glossy | homogeneous smooth & glossy |
| Maize | QUINOLATE PRO | 0,680 | S. 5011 | 0,200 | 0,100 | dull poor homogeneity | smooth & glossy homogeneous |
| Flax | PRELUDE | 0,200 | S. 2020 | 0,500 | 0,100 | moist & glossy | dry & glossy |
| Dwarf beans | CORMAISON FI | 0,100 | S. 2020 | 0,200 | 0,200 | heterogeneous moist & dull | homogeneous, glossy smooth & dry |

EXAMPLE 2

A mica-based desiccant powder according to the invention was compared with a talc-based desiccant powder, used up to the present. Experimental protocol:

A film is formed on the surface of 100 g of colza grains in a HEGE 1 machine by a paste containing plant protection agents and a cellulose film and exhibiting the following composition by weight:

Mesurol ®: 42.8%
Pomarsol ®: 4.3%
Film-forming agent: 10%
Water: 42.9%

A first batch of film-coated grains is dried by a desiccant powder according to the invention containing 99% by weight of mica and 1% by weight of a flow-promoting agent, in a proportion of 2 g of desiccant powder per kilogram of grains.

Three other lots of film-coated grains are dried by means of a talc-based desiccant powder, in a proportion of 2 g, 3 g and 5 g per kilogram of grains, respectively.

The efficiency of drying is measured by the number and size of the "agglomerates" of colza grains, identified in 10 g of dried film-coated grains.

The results obtained are reported in table 2.

These results show that the mica-based powder according to the invention is more effective than the powder of the prior art, based on talc, since it is observed that the mica-based powder at a dose of 2 g per kilogram of grains has the same drying capacity as talc-based powder at a dose of 5 g/kg.

Furthermore, the appearance of the grains dried by means of the powder conforming to the invention is glossy whereas that of the grains dried for comparison with the talc-based powders is dull and lackluster.

TABLE 2

| Number of agglomerates containing | Desiccant powder | | | | |
|---|---|---|---|---|---|
| | None | Mica 2 g/kg | Talc 2 g/kg | Talc 3 g/kg | Talc 5 g/kg |
| +10 grains | 6 | 0 | 1 | 0 | 0 |
| 5-10 grains | 29 | 0 | 8 | 2 | 0 |
| 2-5 grains | 46 | 3 | 10 | 5 | 4 |
| Total number of agglomerates | 81 | 3 | 19 | 7 | 4 |

EXAMPLE 3

A desiccant powder according to the invention containing different types of absorbents was compared with a talc-based powder of the prior art. The efficiency of drying is measured in the same manner as for example 2 by the number and size of the agglomerates of film-coated and dried colza grains. The results obtained, which are reported in part in table 3, show that the desiccant powders based on a cellulose/mica mixture are at least as effective as the talc-based powders of the prior art.

Furthermore, although of a less glossy appearance than that obtained with a desiccant powder containing mica alone, the grains film-coated and dried with the aid of a powder conforming to the invention are not bleached, in contrast to the grains treated with talc-based powders.

In addition, it is observed that the desiccant powders conforming to the invention contribute to the formation of a completely uniform film around the grain.

TABLE 3

| Number of agglomerates containing | Desiccant powder | | |
|---|---|---|---|
| | Talc 2 g/kg | Cellulose 30% Mica 70% 2 g/kg | Cellulose 50% Mica 50% 2 g/kg |
| +10 grains | 1 | 0 | 0 |
| 5-10 grains | 8 | 0 | 3 |
| 2-5 grains | 10 | 8 | 10 |
| Total number of agglomerates | 19 | 8 | 13 |

EXAMPLE 4

The toxicity of the powders conforming to the invention towards grain was determined in accordance with the following experimental protocol:

Maize grains are film-coated by a paste having the following composition by weight:
Cellulosic film-forming agent: 13%
Cormaison ® TF1 (plant protection agent): 19%
Water: 68%

The grains thus coated are dried by means of a powder constituted exclusively of mica at a dose of 2 g per kilogram of grains.

The germination capacity at the end of 5 days is determined on 300 grains placed on moist sterile blotting paper at a temperature of 25° C.

The percentage of grains having germinated in a cold test was also determined on 100 film-coated maize grains after 10 days (7 days at 10° C. + 3 days at 25° C.). The same measurements were made on a control sample (maize grains and Cormaison).

The results assembled in table 4 show that there is no significant difference, from the point of view of toxicity, between the results obtained with the grains film-coated and dried in conformity with the invention, and the control.

TABLE 4

|  | Germination capacity (%) | Cold test (%) |
|---|---|---|
| Control maize + Cormaison | 94 | 92 |
| Test maize dried + film-coated | 92 | 90 |

An open field test was carried out on dried, film-coated maize in an enclosure inaccessible to the public. The results obtained shown in table 4A below confirm the harmlessness of the treatment.

Similar results were obtained on many other grains, in particular colza, soja and sunflower seeds, film-coated, treated and dried by various mica-based powders.

TABLE 4A

|  | Seedlings emerged (%) | Robust seedlings (%) |
|---|---|---|
| Control | 89,8 | 86,8 |
| Test | 92,9 | 90,1 |

EXAMPLE 5

Industrial Application to the Drying of Maize 5 metric tonnes (t) of maize were treated per hour by means of a HEID machine (registered trademark), constituted of two cylinders arranged in cascade (diameter: 1 m, length: about 2 m).

The surface film-coating operation was carried out by spraying with a paste in a proportion of 2 kg of paste per quintal of maize, in front of the first cylinder.

This paste is composed of a plant protection agent (Cormaison ®), an orange cellulosic film-forming agent and water (about 1.6 kg per quintal of grains).

The desiccant powder consisting of:
Mica: 94.5%
Pigment (iron oxide): 5%
flow-promoting agent: 0.5%
is introduced at the exit of the first cylinder by means of a powder metering device in a proportion of 200 g/quintal of grains.

The drying is carried out during the mixing in the second cylinder.

Maize grains perfectly surface-coated, of glossy appearance, non-adhesive are obtained. No agglomerates were detected.

EXAMPLE 6

Industrial Application to the Drying of Colza

The colza is film coated in a HULIN machine type HB 200, equipped with a double mixing vat (about 5 m long). A paste consisting of plant protection agents (Mesurol ®-Pomarsol ®), a film-forming agent and water (representing 40% by weight of the paste) is introduced into the front of the machine in a proportion of 6 l/quintal of colza.

The desiccant powder constituted of:
Mica: 70%
Clay: 29%
Flow-promoting agent: 1%
is introduced by means of a powder metering device at ⅓ along the mixing vat at a dose of 1 kg/quintal of colza.

Grains are thus treated at a rate of 3.7 t/h.

The colza emerges from the machine perfectly dry, without agglomerates.

EXAMPLE 7

Industrial Application to the Treatment of Wrinkled Peas.

Wrinkled peas are film-coated under climatic conditions such that the room temperature is close to 10° C., thus preventing the drying of the grains by a simple current of air.

The film-coating machine used bears the Gustafson trademark.

It is constituted of two hexagonal drums 2.5 m long and about 0.9 m in diameter.

The film-coating paste containing 60% by weight of water is introduced by a system of buckets at the front of the machine.

A desiccant powder composed of:
Mica: 99%
Flow-promoting agent: 1%
is introduced in a proportion of 200 g/quintal of grains by means of a powder metering device.

The seeds are treated at a rate of 10 t/h.

The wrinkled peas emerge from the machine dry and can be bagged directly without causing soiling of the sacks.

EXAMPLE 8

Colored Desiccant Powders.

Mica-based, colored desiccant powders prove to be particularly effective for drying and coloring grains treated with a plant protection product in oily or aqueous solution.

The plant protection product is distributed by being "churned" with the grains. The desiccant powder is then dusted and mixed with the treated grains until maximal coloration is developed.

The seeds thus obtained have a homogeneous, glossy colored appearance and a dry touch. The binding of the plant protection product is effective and stable with time.

The examples below illustrate this particular application.

8.1. Drying of maize

A desiccant powder is prepared by mixing:
Mica: 70 g
Titanium dioxide: 25 g
Violet coloring powder: 5 g 1.2 g of an oily plant protection product Prowet ® EW 500, marketed by the CIBA-GEIGY company, is mixed with 100 g of maize grains in a HEGE 1 machine for 15 seconds.

1.5 g of the desiccant powder is then dusted onto the grains and mixed for 30 seconds at the end of which an intense violet-blue coloration has developed.

8.2 Drying of colza a) The desiccant powder used is composed of:
Mica: 25%
Methylcellulose: 25%
Red mother-of-pearl-hued pigment: 50%

The red mother-of-pearl-hued pigment used in this study is Iriodine ® 504 supplied by the MERCK company.

2 g of a mixture of plant protection products: Pomarsol (15%)+oily Isophenphos (85%) are mixed in a HEGE 1 machine with 100 g of colza.

1.2 g of the above desiccant powder is subsequently dusted onto, then mixed for 35 seconds with the treated grains.

The seeds obtained have a dry appearance, free of agglomerates and are homogeneous and purple in color.

b) 100 g of colza are mixed in a HEGE 1 machine with 2 g of a plant protection mixture constituted of 0.3 g of Thiram ® (powder) and 1.7 g of oily Isophenphos ®.

The colza thus treated is dried by 3 g of a powder having the composition:
Mica: 59 g
Prussian blue: 20 g
Titanium dioxide: 20 g
Aerosil: 1 g The grains rapidly assume a perfectly distributed, intense blue color; they are dry to the touch.

No agglomerates are observed.

We claim:

1. A process for drying a germinative substrate of grains or seeds which have been wetted in a coating or surface film-forming treatment, said process comprising dusting said substrate with a desiccant powder comprising absorbents in an amount of at least 50% by weight with respect to the total weight of the powder, said absorbents comprising at least one aluminosilicate in an amount of at least 25% by weight with respect to the total weight of the absorbents, said substrate being dusted with 0.5 to 50 g of dessicant powder per kilogram of substrate, said powder being substantially free of components which would interfere with germination of the substrate.

2. A process according to claim 1, wherein the dessicant powder further comprises a pigment, said pigment being present in said powder in an amount of up to 50% by weight.

3. A process according to claim 2, wherein said pigment is a micaceous pigment.

4. A process according to claim 2, wherein said pigment is present in the form of a pigmentary paste.

5. A process according to claim 2, wherein said powder further comprises a flow-promoting agent, said flow-promoting agent being present in said powder in an amount of up to 20% by weight.

6. A process according to claim 5, wherein the flow-promoting agent is powdered silicas.

7. A process according to claim 1, wherein said absorbents are in the form of particles having a mean diameter of less than 100 um.

8. A process according to claim 1, wherein said at least one aluminosilicate is selected from the group consisting of mica, the illites, the micaceous clays, the micaceous pigments, kaolin, kaolinite, dickite, nacrite, the montmorillonites, the smectites, the glauconites, the attapulgites and the vermiculites.

9. A process according to claim 1, wherein said at least one aluminosilicate comprises mica.

10. A process according to claim 1, wherein said absorbents further comprise at least one substance selected from the group consisting of talc, cellulose and its derivatives, and silica.

11. A process according to claim 10, wherein said absorbents consist essentially of said at least one aluminosilicate and said at least one substance, said at least one substance being present in said absorbents in an amount of up to 75% by weight.

12. A process according to claim 10, wherein the powder consists essentially of said at least one aluminosilicate, said at least one substance, a pigment, and a flow-promoting agent.

13. A process according to claim 10, wherein the powder consists essentially of said at least one aluminosilicate, said at least one substance, a pigment, a film-forming agent and a flow-promoting agent.

14. A process according to claim 1, wherein the powder further comprises a pigment and a film-forming agent, and wherein the pigment and the film-forming agent are present in the powder in an amount of up to 50% by weight.

15. A process for coating a germinative substrate of grains or seeds with a dressing to protect or to accelerate the germination of said substrate, said process comprising
  (a) forming a film or coating on the substrate by treating said substrate with a fluid composition comprising said dressing, a film-forming agent and water, said composition being sufficiently fluid to ensure uniform distribution of the dressing on the substrate; and
  (b) removing at least some of said water from said substrate by dusting the substrate with a dessicant powder comprising absorbents in an amount of at least 50% by weight with respect to the total weight of the powder, said absorbents comprising at least one aluminosilicate in an amount of at least 25% by weight with respect to the total weight of the absorbents, said substrate being dusted with 0.5 to 50 g of dessicant powder per kilogram of substrate, said powder being substantially free of components which would interfere with germination of the substrate.

16. A process as claimed in claim 15, wherein the film-forming agent is glossy, and the substrate after it has been dusted with said powder has a glossy appearance.

17. A process as claimed in claim 15, wherein the fluid composition comprises about 50 grams/kilo of substrate treated.

* * * * *